United States Patent
Cormier, Sr.

[11] Patent Number: 6,011,463
[45] Date of Patent: Jan. 4, 2000

[54] UNIVERSAL, REMOTE, CONTINUOUS VEHICLE TIRE AIR PRESSURE MONITORING AND REPORTING SYSTEM

[76] Inventor: Levite Cormier, Sr., 174 Mark St., Bristol, Conn. 06010

[21] Appl. No.: 08/962,264

[22] Filed: Oct. 31, 1997

[51] Int. Cl.$^7$ .................................................. B60C 23/00
[52] U.S. Cl. ......................... 340/447; 340/442; 340/445; 73/146.5
[58] Field of Search .................... 340/442, 445, 340/447, 448; 73/146.5

[56] References Cited

U.S. PATENT DOCUMENTS

| | | | |
|---|---|---|---|
| 4,159,465 | 6/1979 | Hatcher | 340/442 |
| 4,311,985 | 1/1982 | Gee et al. | 340/447 |
| 4,316,176 | 2/1982 | Gee et al. | 340/447 |
| 4,807,658 | 2/1989 | Patti | 137/223 |
| 5,065,134 | 11/1991 | Schmid et al. | 340/442 |
| 5,109,213 | 4/1992 | Williams | 340/447 |
| 5,134,880 | 8/1992 | Gerhard | 73/146.5 |
| 5,289,160 | 2/1994 | Fiorletta | 340/447 |
| 5,289,161 | 2/1994 | Huang | 340/447 |
| 5,302,939 | 4/1994 | Downs et al. | 340/447 |
| 5,505,080 | 4/1996 | McGhee | 73/146.5 |
| 5,694,111 | 12/1997 | Huang | 340/442 |
| 5,717,135 | 2/1998 | Fiorletta et al. | 340/447 |

*Primary Examiner*—Jeffery A. Hofsass
*Assistant Examiner*—Van T. Trieu
*Attorney, Agent, or Firm*—John D. Gugliotta

[57] ABSTRACT

This invention is a method and system for reporting the under or over pressure conditions on motor vehicle tires. The device is comprised of air hoses, pressure sensors, radio transmitters with antennas, a radio receiver, a display unit with lights, batteries, lights, and associated electrical components. An assembly mounted on the front of each wheel, over or in place of the hubcap, consists of an air pressure monitor utilizing air pressure inflation valves, a radio transmitter with battery cell, a radio transmitter antenna, and high/low indicator lights. Air hoses attached to each tire's valve stem are connected to the air pressure inflation valves of the air pressure monitors. The wheel mounted transmitters are powered by a low voltage battery that is normally powered off until activated by the changes of the pre-set air pressure of the tire air pressure monitoring sensor.

4 Claims, 8 Drawing Sheets

UNIVERSAL, REMOTE, CONTINUOUS VEHICLE TIRE AIR PRESSURE MONITORING AND REPORTING SYSTEM

RELATED APPLICATIONS AND DISCLOSURES

The present invention was first disclosed in Disclosure Document Number 415,789 filed on Mar. 10, 1997. There have not been any previously filed, nor any co-pending applications, anywhere in the world.

BACKGROUND OF THE INVENTION

1. Field of the Invention

The present invention relates generally to tire pressure monitoring devices and, more particularly, to a universal, remote, continuous vehicle tire air pressure monitoring and reporting system.

2. Description of the Related Art

The importance of maintaining proper air pressure in vehicle tires is well known. There are many reasons for this.

First, maintaining proper air pressure makes driving the vehicle safer. If the air pressure falls lower than a certain level, the tire becomes dangerous, and may break apart or puncture. This is especially dangerous for drivers of vehicles on the highway, because most vehicles become difficult to control with flat tires at high speeds. Many injuries result each year from blown out tires. Also, in hotter weather, the air pressure in the tire may rise to an unsafe level and cause a blowout.

Second, maintaining proper air pressure through monitoring allows the driver to reduce the wear problems associated with higher or lower than acceptable tire pressure. This results in longer tire life, which would save the typical truck owner thousands of dollars each year in replacement tire costs.

However, it is burdensome for a driver to perform frequent tire pressure checks utilizing hand held pressure measuring devices. Most automobile drivers do not want to take the time to perform such checks, and semi-trailer drivers have too many tires to check them on a frequent basis. Therefore, the need arose for tire pressure monitoring devices that would eliminate the need for frequent manual tire pressure monitoring.

The previous art consists of several devices which provide the wheels of vehicles with tire pressure monitors which detect losses of air pressure in the pneumatic tires of such wheels. These devices, however, have one or more of the following problems.

First, the monitors can be complex, and therefore, expensive to manufacture. The public is less likely to purchase an expensive monitoring system.

Second, the use of the monitors can result in leakage of air from the tire. This problem actually creates the problem that the system is designed to warn the driver about.

Third, the pressure sensors are not compact enough to be easily mounted in an unobtrusive location on the wheel.

Fourth, the previous devices are not easily installed and removed, which makes it difficult to reinstall the devices when an owner trades in his car for a new car.

Fifth, the devices monitor only low tire pressure. Thus, the problem of warning the driver of dangerous pressure increases due to heat is not addressed.

Sixth, most of the devices require visual inspection of each wheel to determine which tire has incorrect air pressure.

Seventh, of those devices that measure both high and low pressure problems, visual inspection of the tire is still needed to determine which type of problem exists.

Eighth, many of these devices require excessive use of battery power. Without the battery, the system does not function adequately.

Ninth, the devices do not provide for testing the air pressure at each wheel. This is necessary to assure the driver that the system is operating effectively.

Tenth, the devices do not provide for testing the battery. This is crucial because if the battery is nonfunctional, then the driver will not be informed of any tire pressure problems.

A search of the prior art did not disclose any patents that read directly on the claims of the instant invention; however, the following references were considered related:

| U.S. Pat. No. | Inventor | Issue Date |
| --- | --- | --- |
| 5,134,880 | Hettich Gerhard | Aug. 4, 1992 |
| 5,109,213 | John J. Williams | Apr. 28, 1992 |
| 5,065,134 | Hans-Dieter Schmid | Nov. 12, 1991 |
| 4,316,176 | Thomas A. Gee, et al. | Feb. 16, 1982 |
| 4,311,985 | Thomas A. Gee, et al. | Jan. 19, 1982 |
| 4,159,465 | Creel W. Hatcher | Jun. 26, 1979 |

Each of the devices that make up the previous art have one or more of the problems listed above. None of these such devices have yet been commercially successful, however. These undesirable attributes may account for the limited use of the previous devices by the public. Consequently, a need has been felt for providing an apparatus and method which overcomes the problems cited above.

SUMMARY OF THE INVENTION

It is therefore an object of the present invention to provide an improved universal, remote, continuous vehicle tire air pressure monitoring and reporting system.

Briefly described according to one embodiment of the present invention, the present invention is comprised of air hoses, pressure sensors, radio transmitters with antennas, a radio receiver, a display unit with lights, batteries, lights, and associated electrical components. An assembly mounted on the front of each wheel, over or in place of the hubcap, consists of an air pressure monitor utilizing air pressure inflation valves, a radio transmitter with a battery cell, a radio transmitter antenna, and high/low indicator lights. Air hoses attached to each tire's valve stem are connected to the air pressure inflation valves of the air pressure monitors. The present invention continuously monitors the air pressure in each of the vehicle's tires individually. The wheel mounted transmitters are powered by a low voltage battery that is normally powered off until activated by the changes of the pre-set air pressure of the tire air pressure monitoring sensor.

In a preferred embodiment of the present invention, the battery powered radio transmitter and antenna convey the tire pressure information via a short range radio signal to a multiple frequency receiver/display unit mounted inside the passenger compartment. Each wheel mounted radio transmitter is set to a different frequency. The radio receiver installed in the vehicle cab is equipped with a display unit with lights to identify individual tire air pressure. If the air pressure in any tire either lowers or increases to a predetermined unsafe level, a warning signal is sent to the radio receiver and display unit, activating the light which corresponds to the tire with air pressure problems. Thus, which tire has a problem is readily visible to the driver.

A signal is also sent to the wheel mounted high/low air pressure indicator lights, activating the appropriate light. The driver would then check the high and low pressure lights mounted on the wheel which was indicated by the cab mounted indicator to determine the appropriate course of action. The cab mounted indicator informs the driver which tire has unacceptable air pressure, and the wheel mounted high/low indicator lights tell the driver whether that tire has too much or too little air pressure.

In an alternate embodiment, each wheel mounted radio transmitter would be set to the same frequency, and a single frequency radio receiver is set to a matching frequency. The receiver has a single indicator light mounted in the passenger cab. Thus, if the air pressure in any tire either lowers or increases to a predetermined unsafe level, the driver is alerted that a problem exists with one of his tires. The driver would then visually check the high/low air pressure indicator lights on each of the tires to determine which tire has the problem. Once the tire has been identified, the driver could also determine whether the tire needed more or less air by looking to see which of the two high/low air pressure indicator lights was activated. Thus the wheel mounted high/low pressure indicator lights are used to identify the specific tire with the problem and what that problem is. The driver can then take appropriate action, such as adding air, removing air, or replace the tire with a spare.

An advantage of the present invention is that the system is universal in that it can be adapted to function on vehicles with a varied number of tires, such as a four-tired automobile and a semi-trailer. This reduces inventory costs for manufactures and distributors and saves shelf space at retail stores. Also, the system could be moved from one vehicle to another, as when an owner buys a new car.

Another advantage of the present invention is that it is simple, and therefore, inexpensive to manufacture. This savings, if passed on to the consumer, may influence the public to utilize the devices. A simple design also makes installation and removal simple.

Another advantage of the present invention is that it can be easily installed and moved from one vehicle to another. This is beneficial for owners who want to trade in their existing cars for a new car and want to install the current device in this new car.

Another advantage of the present invention is that it continuously monitors tire pressure, so that problems can be identified immediately, thereby, avoiding potential injuries that occur between the time the tire problem was created and the monitoring system detected it. This early warning system is crucial to vehicle and passenger safety. In the preferred embodiment, the driver is able to know the condition of all of his tires at all times.

Another advantage of the present invention in its preferred embodiment is that the cab mounted display informs the driver of which tire is experiencing air pressure difficulties. This provides ease of diagnosis, reducing the time and stress associated with determining which tire is having problems, especially when the vehicle is pulled on the side of highways with cars speeding past.

Another advantage of the present invention is that it monitors both low and high tire pressure. Thus, the problem of warning the driver of dangerous pressure increases due to heat is addressed.

Another advantage of the present invention is that the wheel mounted high/low pressure indicator lights on each tire inform the driver of whether that tire has high or low tire pressure. Thus, manual tire pressure gauges are not necessary to check each tire, but may occasionally be used when air needs to be added or released or for verification, although the present system will accomplish these tasks. This saves time and eliminates the need for the driver to carry manual tire pressure gauges.

Another advantage is that the installation mounting can include a locking means to prevent unwanted or unauthorized removal of the device.

Another advantage of the present invention is that both the wheel mounted high/low pressure indicator lights and the cab mounted display unit lights are easy to see. Further, the wheel mounted pressure indicator lights can be seen in the dark and through fog. This eliminates the need for the driver to carry a flashlight with him or her.

Another advantage of the present invention is that the wheel mounted transmitters are powered by a low voltage battery that is normally powered off until activated by the changes of the pre-set air pressure of the tire air pressure monitoring sensor. Thus, the battery lasts longer, and subsequently, the system functions efficiently longer. Additional, a light, flag, or other indicator device can be utilized to indicate battery drain or failure.

Another advantage of the present invention is that it provides for manually testing the tire pressure. This feature assures the driver that the system is operating effectively.

Another advantage of the present invention is that it provides for testing the battery at each wheel. This is crucial because if the battery is non-functional, then the driver will not be informed of any tire pressure problems.

Another advantage of the present invention is that leakage of air from the tire at the attachment point to the system is eliminated. Thus, the present invention does not create the problem that it is designed to warn the driver about.

Another advantage of the present invention is that the pressure monitoring device and transmitter assembly is compact enough to be easily mounted in an unobtrusive location in the center hub on the wheel, and therefore does not change the balance of the wheel.

Another advantage of the present invention is that it reduces tire wear caused by improperly inflated tires, thus reducing replacement tire costs.

Another advantage of the present invention is that it increases driver safety, by warning the driver of potentially dangerous tire pressure problems as they occur. This is needed given the fact that frequent manual tire pressure checks are burdensome for both passenger car drivers and semi-trailer.

Another advantage of the present invention is that proper air pressure is maintained, which can be crucial for the user of recap tires. Low air pressure for the weight of the load carried is the primary cause of tire caps dislodging from the tires, thereby creating a hazardous condition for the vehicle and for other vehicles nearby.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
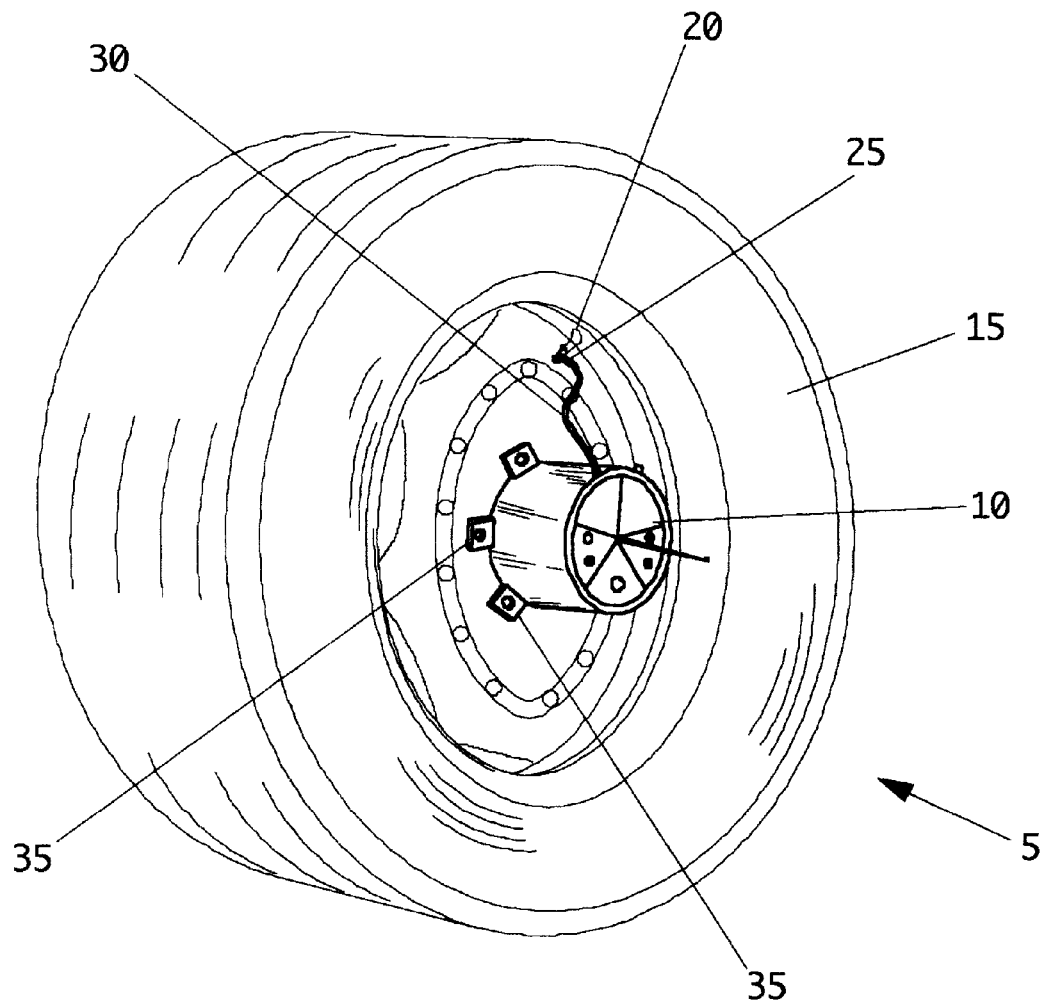
FIG. 1 is a perspective view of the transmitting device shown utilized on a single hub tire according to the preferred embodiment of the present invention.

Referring now to FIG. 1, a perspective view of the transmitting component of the universal, remote continuous vehicle tire air pressure monitoring and reporting system 5, described as a single rim wheel transmitter 10, is shown in a utilized state on a single hub tire 15. The single rim wheel transmitter 10 will be described in greater detail hereinbelow. The single rim wheel transmitter 10 is connected to a conventional tire valve 20 via a tee-fitting 25 and a first connection hose 30. The tee-fitting 25 will be described in greater detail hereinbelow. The single rim wheel transmitter 10 is held in position on the single hub tire 15 via a plurality of mechanical fastening means 35 such as the tire lug nuts tightened in positioned over the wheel studs. It can be seen by those familiar in the art that other methods including friction mount snap attachments, screws, a threaded connection, etc. could also be utilized with equal effects. In addition, the single rim wheel transmitter 10 could be mounted off center of the wheel axis in those instances where space requirements dictated such action. It is envisioned in those said instances, a counterweight located 180° in relation to the single rim wheel transmitter 10 with respect to the wheel axis would be utilized as to not affect wheel balance and motor vehicle handling.

Figure 1A:
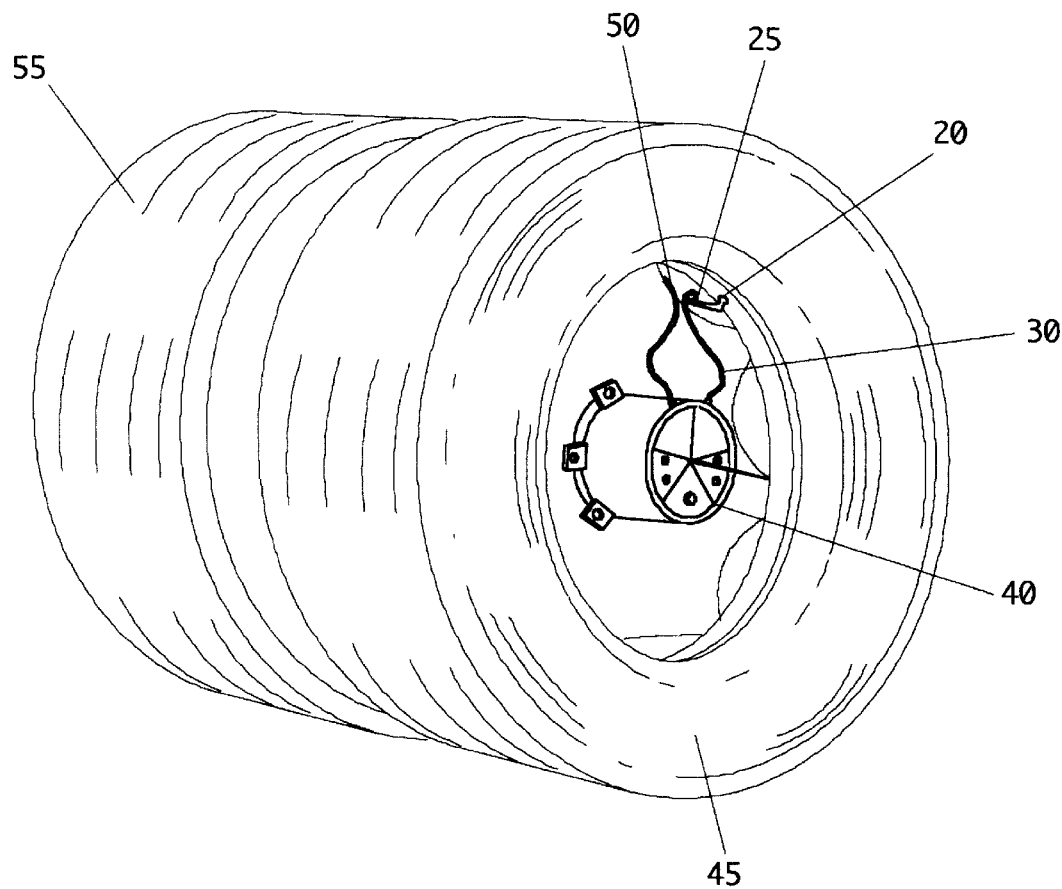
FIG. 1a is perspective view of the transmitting device shown utilized on a dual hub tire.

Referring next to FIG. 1a, a perspective view of a double rim wheel transmitter 40 is shown utilized on a double hub tire 45. The method of attachment of the double rim wheel transmitter 40 to the double hub tire 45 remains the same as previously mentioned for attaching the single rim wheel transmitter 10 to the single hub tire 15 as shown in FIG. 1. An additional component of FIG. 2 is a second connection hose 50 which connects through a tee-fitting 25 (not shown for clarity) to an interior tire 55 via its respective conventional tire valve 20 (not shown for clarity).

Figure 2:
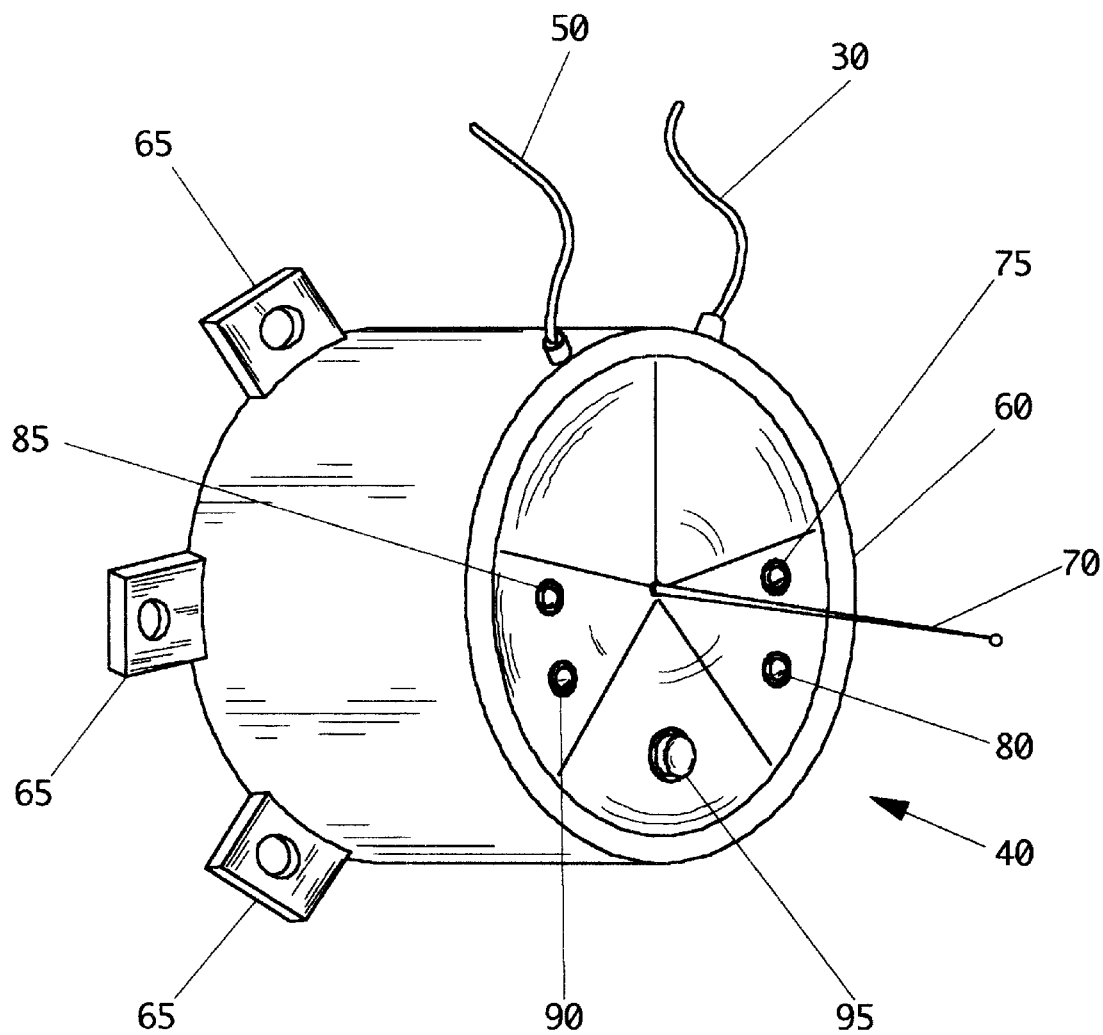
FIG. 2 is a detailed perspective view of the transmitting device.

Referring now to FIG. 2, a detailed perspective view of the double rim wheel transmitter 40 is disclosed. A detailed perspective view of the single rim wheel transmitter 10 would appear similar, though without the additional components to interface it to the interior tire 55 (not shown in this FIG.). Both the first connection hose 30 and the second connection hose 50 connect into a stamped steel housing 60 and convey the respective air pressure signals from the tires. Located around the base of the stamped steel housing 60 is a plurality of mounting brackets 65 (three of which are shown for illustrative purposes). The mounting brackets 65 allow for connection of the double rim wheel transmitter 40 to the double hub tire 45 (not shown in this FIG.) in a manner as aforementioned described. A transmitting antenna 70 is provided for transmitting an alert signal signifying either an over or under pressure condition in one of the two tires. The receiver and subsequent actions of the transmitted signal by the transmitting antenna 70 will be described in greater detail hereinbelow. Located on the face of the double rim wheel transmitter 40 is a first over pressure indicator light 75, a first under pressure indicator light 80, a second over pressure indicator light 85 and a second under pressure indicator light 90, whose purpose is to indicate over and under pressure conditions of the respective tire. A battery test switch 95 is also located on the face of the double rim wheel transmitter 40 to allow for system testing and performance verification. Further descriptive information on the first over pressure indicator light 75, the first under pressure indicator light 80, the second over pressure indicator light 85, the second under pressure indicator light 90, and the battery test switch 95 will be provided hereinbelow.

Figure 3A:
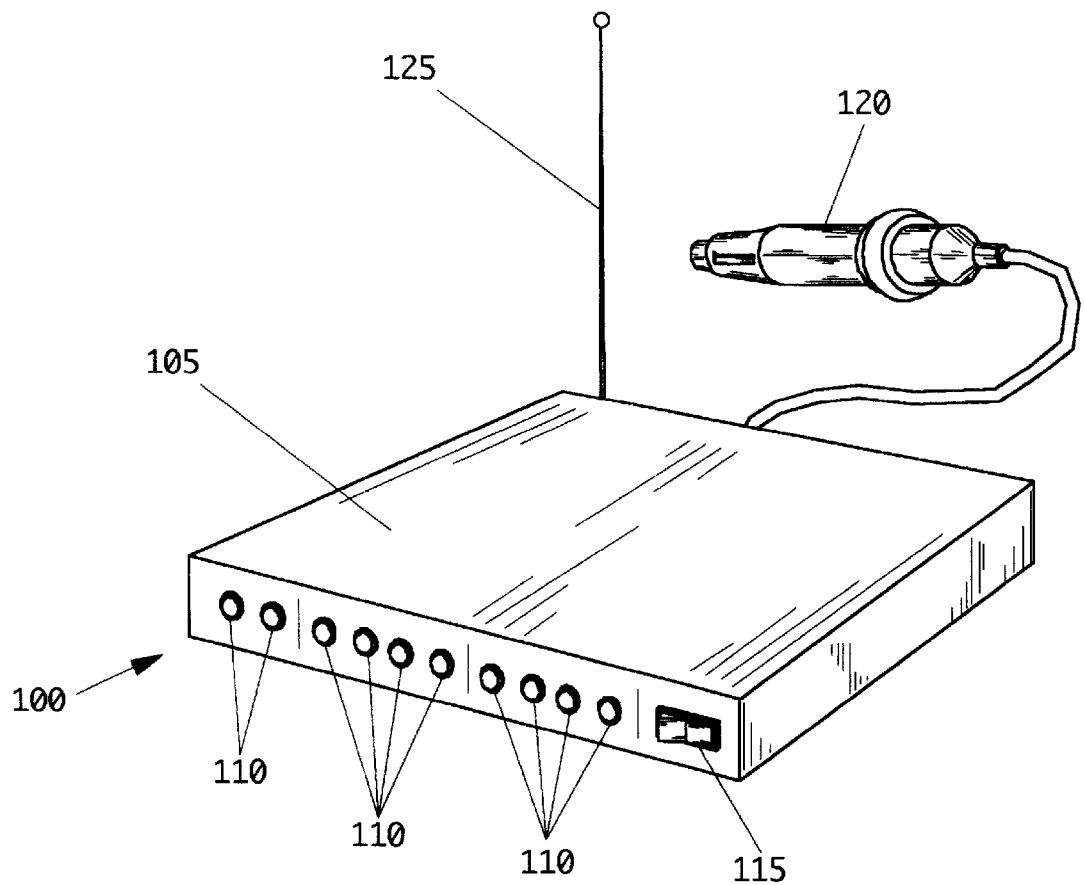
FIG. 3a is a perspective view of the multiple frequency receiver/display unit according to the preferred embodiment of the present invention.

Referring next to FIG. 3a, a perspective view of a multiple frequency receiver display unit 100 according to the preferred embodiment of the present invention is described. An enclosure housing 105 of appropriate dimensions and envisioned of a stamped steel or injection molded plastic nature, possess a plurality of tire indicator lights 110 across its front face as shown. Each of the tire indicator lights 110 indicate the abnormal status of each respective tire on the motor vehicle independently. The current FIG. indicates a total quantity of ten, but the range could be from four for a normal passenger vehicle, up to sixteen or more for a tractor trailer rig. As such, a paired light configuration would be utilized depending upon the vehicle type. For cars, a left front-right front pairing could be utilized, while for trucks having four, six, ten, fourteen, or eighteen wheels, various different configurations would be necessary. An on/off switch 115 controls the application of electrical power from a vehicle power supply connection cord and plug 120. A first receiving antenna 125 intercepts the radio signal from the single rim wheel transmitter 10 or the double rim wheel transmitter 40(not shown in this FIG.) as discussed earlier, and through the use of an internally mounted conventional scanning receiver allows for the activation of the respective tire indicator lights 110 on the front of the multiple frequency receiver display unit 100. The antenna 125 may need to be wired to an out-of-cab mounting locations at each side of the vehicle should interference prevent proper transmission from the wheels.

Figure 3B:
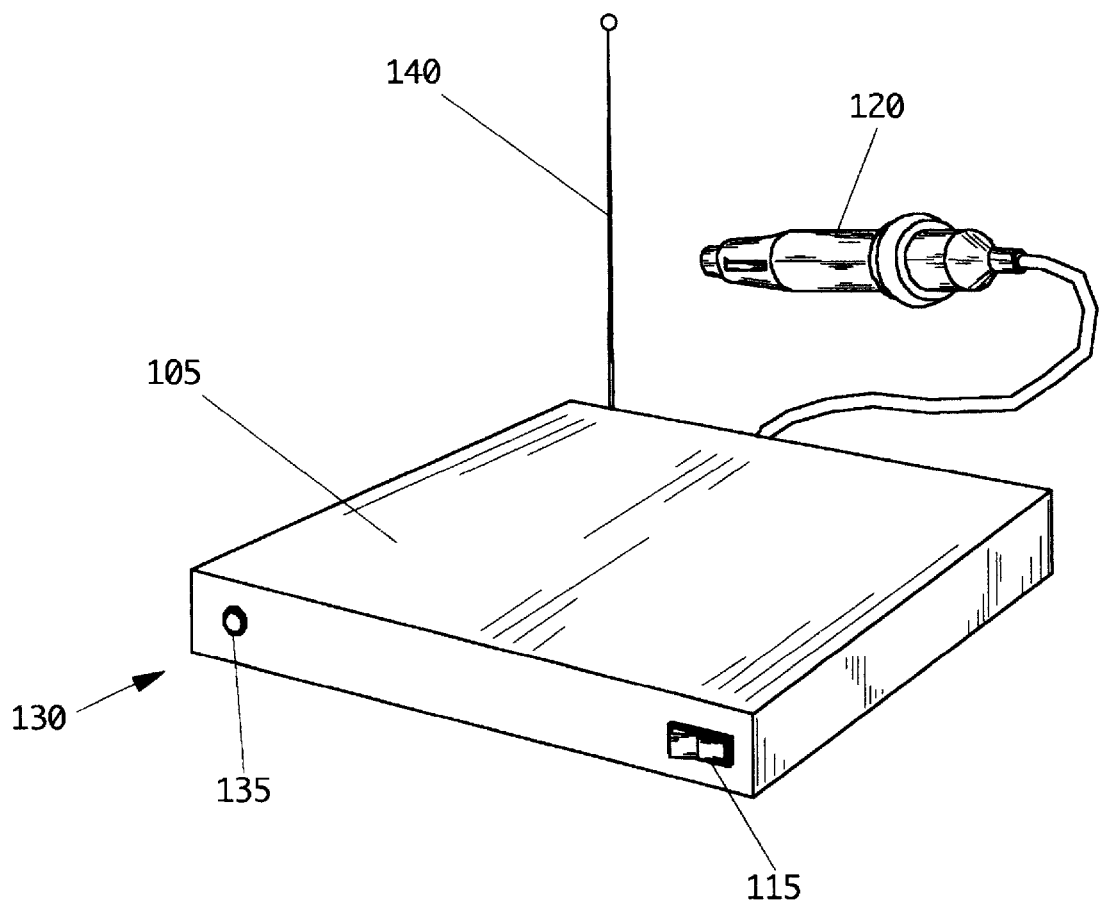
FIG. 3b is a perspective view of the single frequency receiver/display unit according to an alternate embodiment of the present invention.

Referring now to FIG. 3b, a perspective view of a single frequency receiver display unit 130 according to an alternate embodiment of the present invention is disclosed. This embodiment allows for the reduction of complexity of the multiple frequency receiver display unit 100 as presented earlier. A combined indicator light 135 on the face of the single frequency receiver display unit 130 presents the driver with the notification that one of the tires on the motor vehicle is suffering from an over or under pressure condition as received via a second receiving antenna 140. It is then up to the driver to exit the vehicle at his or her convenience and exam the tires on an individual basis and look for the respective first over pressure indicator light 75, first under pressure indicator light 80, second over pressure indicator light 85, or second under pressure indicator light 90. Thus a reduction in complexity and associated manufacturing costs result in additional minor action on the part of the driver to locate the fault condition. The indicated enclosure housing 105, the on/off switch 115, the vehicle power supply connection cord and plug 120, and their associated use and function remain the same as shown earlier in FIG. 3a.

Figure 4:
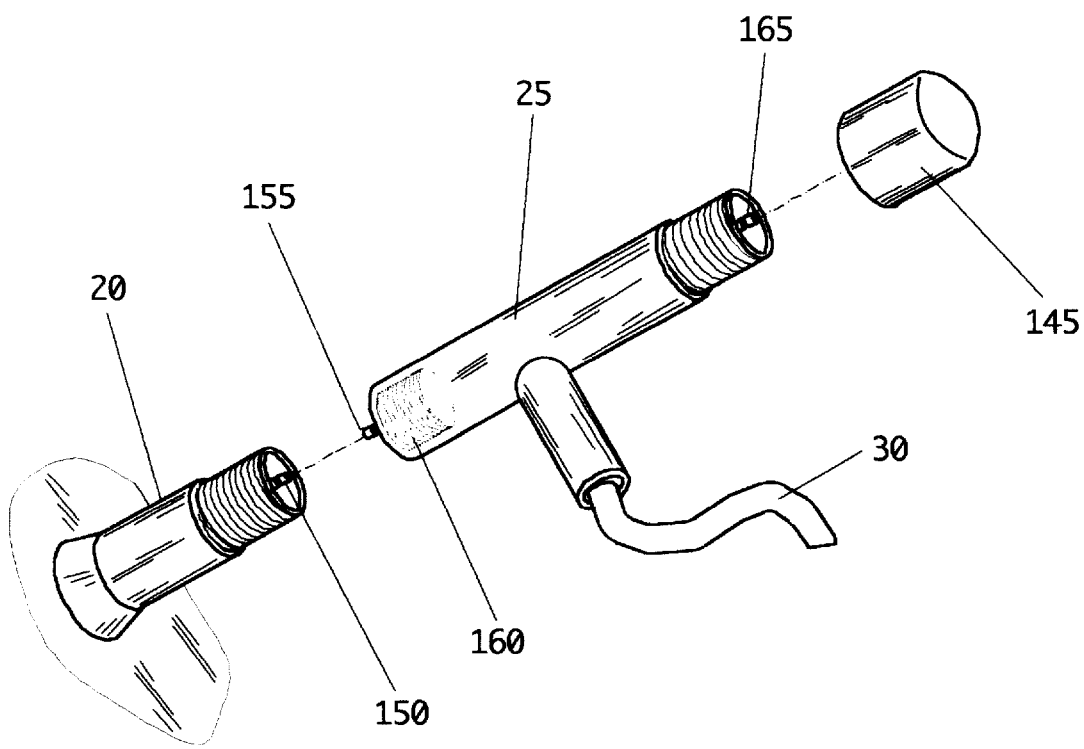
FIG. 4 is a detailed perspective view of the tire stem tee-assembly.

Referring next to FIG. 4, a detailed perspective view of the tee-fitting 25 is depicted. The tee-fitting 25 screws onto the conventional tire valve 20 in a conventional manner. A conventional spring return valve actuator 150 is thereby required at the outer end 165 of the tee-fitting 25 housing. Another actuator 150 in the angled end of the tee-fitting 25 is then affixed to sop air when the connecting hose 30 is removed. The connecting hose 30 air intake end further requires an actuating pin 155 of the same type as the intake end of the tee-fitting 25. A conventional valve stem cap 145 is then screwed onto the exterior end of the conventional valve stem cap 145 as shown for physical protection purposes. A conventional spring return valve actuator 150 is depressed by an actuating pin 155 located inside a reception cavity 160 of the tee-fitting 25 for the purpose of equalizing the pressure inside of the tee-fitting 25 and thus the first connection hose 30 to equal that of the tire. A tee-fitting spring return valve 165 located in the extreme end of the tee-fitting 25 is of the same size, operation, and configuration of a regular tire valve. Thus, with the tee-fitting 25 installed on the conventional tire valve 20, a user can still access tire pressure through the tee-fitting 25 for purposes of inflation pressure verification, the purpose of adding air to the tire to increase pressure, and for the purpose of releasing air pressure. Finally, the first connection hose 30 is connected to the tee-fitting 25 for the purposes of transmitting the tire pressure to the universal, remote continuous vehicle tire air pressure monitoring and reporting system 5 (not shown in this view)

Figure 5:
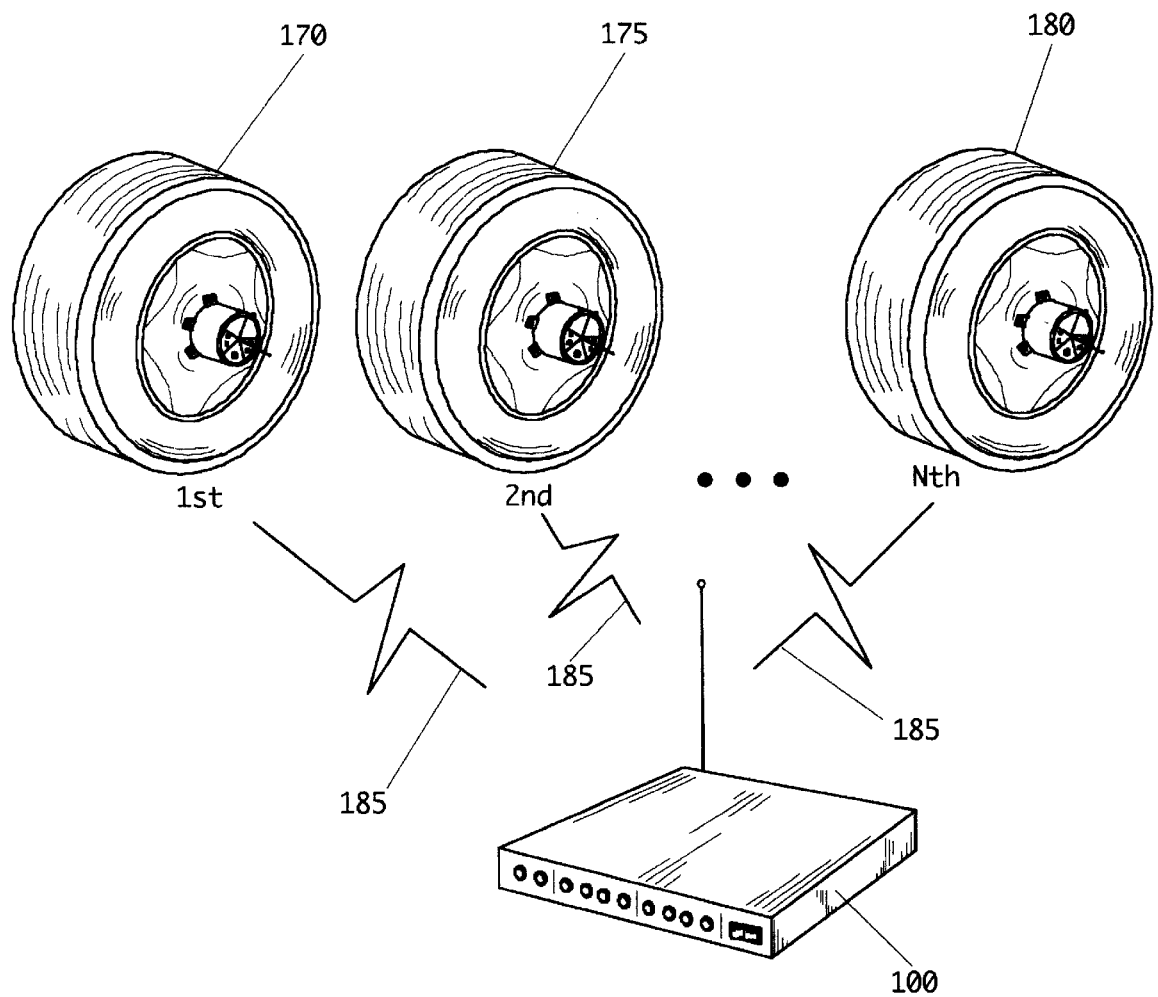
FIG. 5 is an interconnecting block diagram of the universal, remote, continuous vehicle tire air pressure monitoring and reporting system.

Referring now to FIG. 5, an interconnecting block diagram of the universal, remote continuous vehicle tire air pressure monitoring and reporting system 5 is disclosed. A first tire reporting system 170, a second tire reporting system 175, and up through a Nth tire reporting system 180 convey the message that an over or under pressure condition exists in its respective tire. As mentioned earlier, the "Nth" tire would be equal to the total number of tires on the motor vehicle and could vary from four to eighteen or more. A plurality of radio wave communication paths 185 connect the first tire reporting system 170, the second tire reporting system 175, and the Nth tire reporting system 180 up to the tire indicator lights 110. The multiple frequency receiver display unit 100 is shown in this FIG. for illustrative purposes, though it can be seen that the single frequency receiver display unit 130 (not shown in this FIG.) could just as easily been utilized with the same effects. The multiple frequency receiver display unit 100 would be located in the interior of the motor vehicle, where it could easily be seen by the driver. When the radio frequency 185 is transmitted from the reporting system 5 to activate the light at the receiver 10, the appropriate light is also activated on the wheel reporting system 5.

Figure 6:
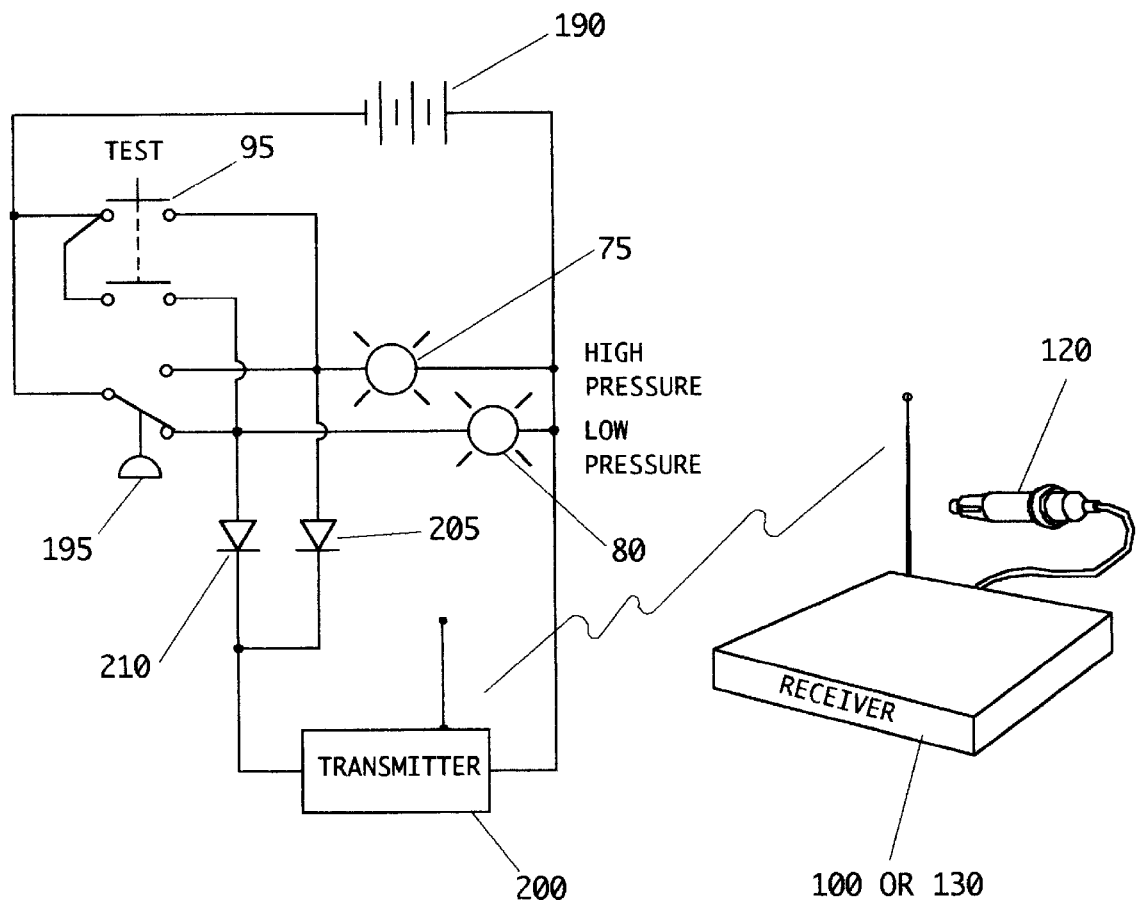
FIG. 6 is a schematic block diagram of the universal, remote, continuous vehicle tire air pressure monitoring and reporting system.

Referring finally to FIG. 6, a schematic block diagram of the universal, remote continuous vehicle tire air pressure monitoring and reporting system 5 is described. The left most portion of the FIG. depicts the schematic of the single rim wheel transmitter 10, though the schematic for the double rim wheel transmitter 40 is similar with a doubling of components to handle the additional tire. A battery 190 provides electrical power through the battery test switch 95 or a single-pole, double-throw pressure switch 195. The single-pole, double-throw pressure switch 195 is envisioned of a conventional, diaphragm nature, though other types of differential pressure switches could be utilized. When the battery test switch 95 is pressed, electrical power is routed to the first over pressure indicator light 75, the first under pressure indicator light 80, and a transmitting module 200. It is envisioned that the transmitting module 200 utilizes low power frequency modulation of an acceptable frequency authorized by the FCC for such use, though it can be seen that other modulation methods would work equally well. The data transmitted is that only of an on/off nature thus, the presence of a signal indicates one state and the absence indicates the other. This action test the lights for proper operation, as well as the transmitting module 200 and its complete path to the multiple frequency receiver display unit 100 or single frequency receiver display unit 130 as whatever the instance may be. Whenever the air pressure in the respective tire rises or falls below the preset parameters of the single-pole, double-throw pressure switch 195 an appropriate signal is routed to either the first over pressure indicator light 75 or the first under pressure indicator light 80 to display the condition. The electrical signal is also routed through a first blocking diode 205 or a second blocking diode 210 to actuate the transmitting module 200. The purpose of the first blocking diode 205 and the second blocking diode 210 is to prevent the electrical power from one condition of the single-pole, double-throw pressure switch 195 from actuating the alternate condition via back fed electrical power. The multiple frequency receiver display unit 100 or the single frequency receiver display unit 130 receives power via the vehicle power supply connection cord and plug 120 as described earlier.

2. Operation of the Preferred Embodiment

In operation, the present invention can be easily utilized by the common user in a simple and effortless manner. To use the present invention with its preferred embodiment can best be described in conjunction with the perspective views of FIG. 1, FIG. 1a, FIG. 2, FIG. 3a, FIG. 3b, and FIG. 4, the interconnecting block diagram of FIG. 5, and the schematic block diagram of FIG. 6.

The user would first install a universal, remote continuous vehicle tire air pressure monitoring and reporting system 5 with the desired operating parameters. Such parameters to be considered would be how many tires are to be monitored, would a multiple frequency receiver display unit 100 or a single frequency receiver display unit 130 be used inside the motor vehicle to monitor tire condition, the associated cost to risk factors, etc. After such a system is chosen and installed in the aforementioned manner, the system is then ready for use. The user would monitor tire pressures on a continual basis. In the instance of the preferred embodiment utilizing a multiple frequency receiver display unit 100, an individual tire indicator lights 110 would annunciate an over or under tire pressure condition. The driver, at his or her earliest convenience, would inspect the indicated tire and by use of the first over pressure indicator light 75 and the first under pressure indicator light 80 (or the second over pressure indicator light 85 and the second under pressure indicator light 90, in the case of double hub tire 45) would take appropriate action by either adding more air or releasing air through the tee-fitting spring return valve 165 of the tee-fitting 25. In the case of the alternate embodiment utilizing a single frequency receiver display unit 130, the driver would be alerted of a possible over or under pressure condition by the combined indicator light 135 of the single frequency receiver display unit 130. The driver would then inspect all tires at his or her earliest convenience and by use of the first over pressure indicator light 75 and the first under pressure indicator light 80 (or the second over pressure indicator light 85 and the second under pressure indicator light 90, in the case of double hub tire 45) would identify the faulty tire and take appropriate action by either adding more air or releasing air through the tee-fitting spring return valve 165 of the tee-fitting 25. These actions allow for the immediate correction of possibly dangerous over or under pressure conditions on motor vehicles.

The foregoing description is included to illustrate the operation of the preferred embodiment and is not meant to limit the scope of the invention. The scope of the invention is to be limited only by the following claims.

What is claimed is:

1. A universal, remote continuous vehicle tire air pressure monitoring and reporting system, said system comprising:

at least one single rim wheel transmitter for affixment to a single hub tire, said single rim wheel transmitter being held in position on the single hub tire via a plurality of mechanical fastening means;

a conventional tire valve connected to the single rim wheel transmitter via a tee-fitting and a first connection hose;

a transmitting antenna for transmitting an alert signal signifying either an over or under pressure condition in said tire;

a multiple frequency receiver display unit having a front face possessing a plurality of tire indicator lights, such that each of said tire indicator lights indicates an abnormal status of each respective tire on a motor vehicle independently;

a first receiving antenna for intercepting said alert signal from the single rim wheel transmitter, an internally mounted conventional scanning receiver for activation of the respective tire indicator lights on the front face of the multiple frequency receiver display unit.

2. The universal, remote continuous vehicle tire air pressure monitoring and reporting system of claim 1, wherein said indicia include a first over pressure indicator light, first under pressure indicator light, second over pressure indicator light, and second under pressure indicator light.

3. The universal, remote continuous vehicle tire air pressure monitoring and reporting system of claim 1, wherein said tee-fitting screws onto the conventional tire valve in a conventional manner and further includes a spring return valve actuator at the outer end of the tee-fitting housing and another actuator in the angled end of the tee-fitting such as to stop air when the connecting hose is removed.

4. The universal, remote continuous vehicle tire air pressure monitoring and reporting system of claim 3, wherein said connecting hose air intake end includes an actuating pin of the same type as the intake end of the tee-fitting.

* * * * *